United States Patent [19]

Jakob

[11] 4,043,770

[45] Aug. 23, 1977

[54] ABSORPTION-ADSORPTION SYSTEM FOR PURIFYING CRYOGENIC GASES

[75] Inventor: Fritz Jakob, Achmuhle, Germany

[73] Assignee: Linde Aktiengesellschaft, Wiesbaden, Germany

[21] Appl. No.: 642,602

[22] Filed: Dec. 19, 1975

[30] Foreign Application Priority Data

Dec. 20, 1974 Germany .............................. 2460515

[51] Int. Cl.$^2$ .......................... B01D 53/04; F25J 3/06
[52] U.S. Cl. .......................................... 55/62; 55/73; 62/18; 62/23
[58] Field of Search .................. 55/62, 73; 62/17, 18, 62/23

[56] References Cited

U.S. PATENT DOCUMENTS

| | | | |
|---|---|---|---|
| 3,085,379 | 4/1963 | Kiyonaga et al. ................... | 55/62 X |
| 3,343,916 | 9/1967 | Cahn et al. ......................... | 55/62 X |
| 3,490,865 | 1/1970 | Huxley ................................ | 55/73 X |
| 3,596,470 | 8/1971 | Jakob .................................. | 62/17 X |
| 3,616,600 | 11/1971 | Kurata et al. ........................ | 62/17 X |
| 3,685,256 | 8/1972 | Barrere, Jr. ......................... | 55/62 |
| 3,691,779 | 9/1972 | Meisler et al. ...................... | 62/23 |
| 3,864,460 | 2/1975 | Connell .............................. | 55/73 X |

Primary Examiner—Thomas G. Wyse
Assistant Examiner—Robert H. Spitzer
Attorney, Agent, or Firm—Millen & White

[57] ABSTRACT

A semi-pure gas such as hydrogen containing a minor quantity of a gaseous impurity such as methane, is further purified by:

a. passing said semi-pure gas at a temperature substantially above the condensation temperature of said gaseous impurity through a first adsorber loaded with said gaseous impurity to desorb and entrain said gaseous impurity, thereby regenerating said first adsorber;

b. cooling resultant desorption gas containing said gaseous impurity to below the condensation temperature of said gaseous impurity to partially liquefy said gaseous impurity;

c. separating said liquefied gaseous impurity from equilibrium gas containing residual amounts of said gaseous impurity; and d. passing said equilibrium gas through a second adsorber previously regenerated as in step (a), and removing at least a portion of said residual amounts of gaseous impurity to yield a purified gas.

26 Claims, 2 Drawing Figures

ABSORPTION-ADSORPTION SYSTEM FOR PURIFYING CRYOGENIC GASES

BACKGROUND OF THE INVENTION

The invention relates to a system for removing impurities from low-boiling point gases, primarily by low-temperature scrubbing.

An enriched hydrogen gas is conventionally obtained by the purification of coke oven gas on the one hand, or cracking gases on the other hand, the latter being derived from the thermal cracking of natural gas or other hydrocarbon mixtures. These gaseous mixtures must be treated to remove undesired components from the hydrogen. There are a variety of techniques which can be used for this purpose. Thus carbon dioxide, water and higher hydrocarbons are predominantly removed by condensation in regenerators, whereas carbon dioxide and hydrogen sulfide impurities are frequently removed by a methanol scrub and carbon monoxide impurity is chemically converted during which further hydrogen is formed, the final step being one of methanization.

When hydrogen is to be used for ammonium synthesis, the last purification stage may be liquid nitrogen scrub thereby permitting such low boiling-point impurities as methane and carbon monoxide to be removed from the gas. A nitrogen scrub will always, however, entrain an appreciable amount of nitrogen gas with the purified hydrogen. Whereas such entrainment is well suited for preparing hydrogen for ammonium synthesis, because nitrogen addition is necessary to obtain a stoichiometric mixture of $3H_2 + N_2$, such $N_2$ entrainment is not suited for other purposes when the hydrogen must be nitrogen-free. In the latter case, the final purification stage often involves scrubbing with liquid methane, whereby hydrogen purities up to 99% may be achieved. However, further purification of hydrogen beyond 99% by methods heretofore known is extraordinarily costly.

SUMMARY OF THE INVENTION

An object of this invention, therefore, is to provide an economical process and apparatus for the enrichment of gases.

A further object is to treat methane-containing hydrogen in an adsorption system which results in a reduction in the methane to below 0.2% by volume in the hydrogen product gas.

A further object is to provide an interrelated absorption-adsorption system for the purification of hydrogen based on the use of a methane scrub.

Upon further study of the specification and appended claims, further objects and advantages of this invention will become apparent to those skilled in the art.

These objects are attained, using a hydrogen-methane mixture as an example, by heating the hydrogen-methane mixture ($\sim$ 99% $H_2$), passing the heated gas over a first adsorbent to desorb adsorbed components (e.g. methane) therefrom, cooling resultant desorption gas to partially liquefy same, the liquid phase containing the desorbed components, separating resultant liquid phase from the hydrogen-methane gas in equilibrium therewith and passing resultant separated hydrogen-methane gas over a second adsorbent at a sufficiently low adsorption temperature to adsorb methane from the gas.

A comprehesive embodiment of the invention embraces the use of hydrogen gas obtained from a methane scrubbing step before the further purification steps. In this connection, such hydrogen gas contains methane at the condensation temperature; consequently said gas cannot be used directly for the desorption of a previously loaded absorbent. Therefore, the invention provides for heating the methane-containing gas generally at least 10° C above, preferably 25° to 45° C above the methane condensation temperature, (the condensation temperature being also the scrubbing temperature) whereby the resultant heated gas can be employed to desorb a loaded adsorber in rapid manner. Of even greater importance is that this type of desorption yields a much purer adsorbent than when using a cold regeneration gas for desorption purposes. In every case the pressure emanating from the adsorbed components of the adsorbent is higher than the partial pressure of these components in the heated gas, so that the components bound to the absorbent will desorb to an appreciable extent into the gas, and be carried away therein.

The desorption gas thereby enriched with adsorbed substance is then cooled in accordance with the invention to a temperature sufficiently below the condensation point of the desorbed substance, so that at least about 40%, preferably 40 to 60% of the methane (composed of both desorbed methane and methane from the scrubbing step) is condensed. Accordingly, the hydrogen-methane gas in equilibrium therewith generally contains not more than 1.5%, preferably about 0.5 to 1.5% by volume of methane.

Following separation of the condensate, said equilibrium gas is then passed over an adsorber regenerated in the manner just described, to remove residual methane, yielding a hydrogen product containing not more than 0.2% by volume of methane.

The nature of the adsorbent in conventional, e.g. silicagel, aluminagel, activated carbon, and molecular sieves.

The difference in temperature between the adsorption and desorption steps is generally about 5° to 60° C, preferably 10° to 35° C.

To increase the thermodynamic efficiency of the process and to minimize fluctuations in the composition of the product gas flow, another aspect of the invention embraces the use of a third adsorber, operated in sequence with adsorption and desorption stages. This third adsorber is cooled after regeneration (desorption) by passing the equilibrium gas separated from the condensed methane therethrough. In this way, the third adsorber is cooled prior to the adsorption period. The resultant heated equilibrium gas is then recooled and subjected to the adsorption stage at a relatively low temperature.

Whereas the invention has been described with reference to the purification of hydrogen gas using a methane scrub, the invention is generally applicable to other purification system using different scrubbing agents.

Examples for cases of application of the invention are the removal of carbon dioxide from raw hydrogen or the removal of sour gases (carbon dioxide and hydrogen sulfide) from natural gas by means of methanol or solutions of organic amines or a hot solution of potash.

BRIEF DESCRIPTION OF DRAWINGS

(The same reference numerals in both figures are directed to the same components.)

DETAILED DESCRIPTION OF DRAWINGS

Figure 1:
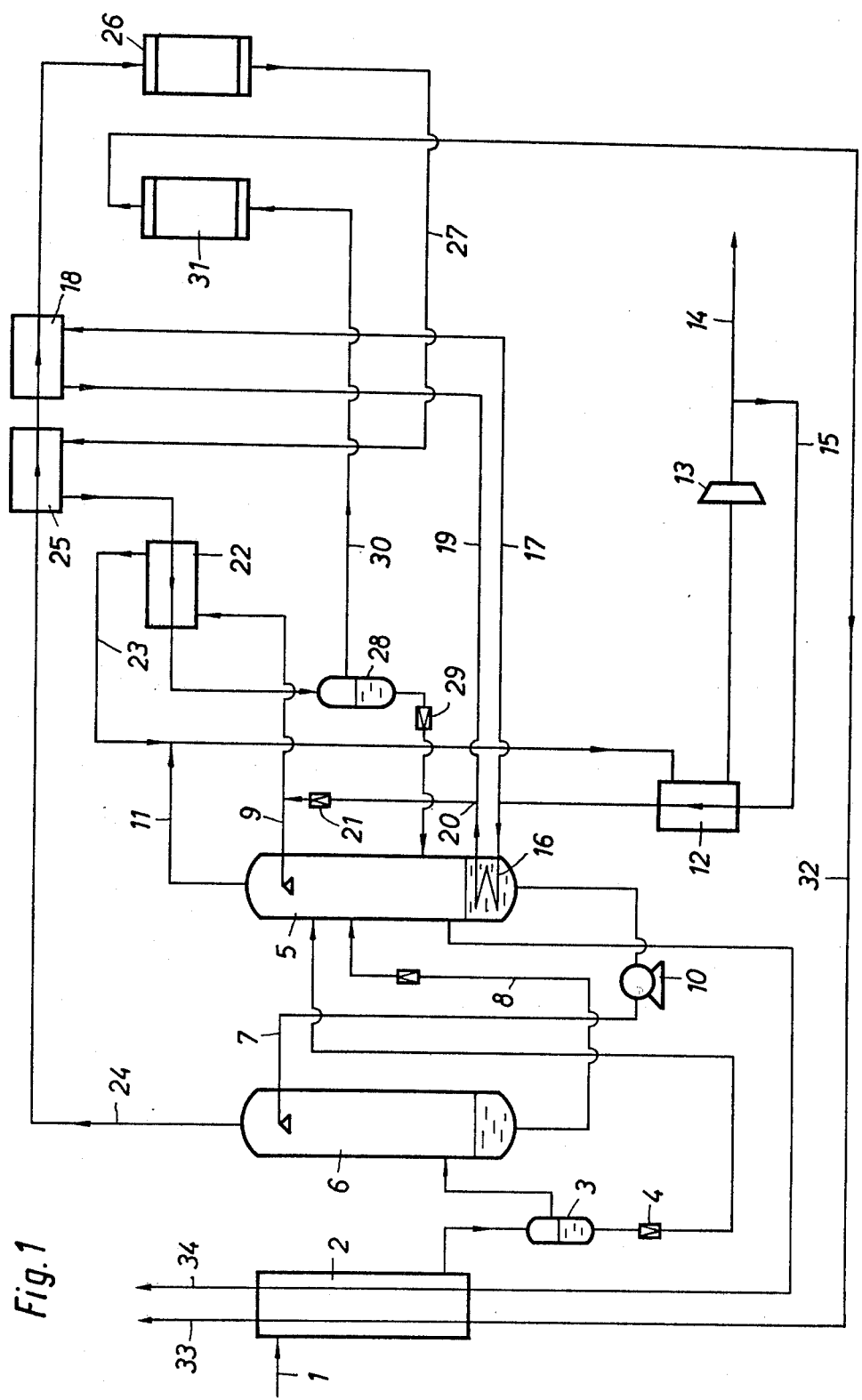
FIG. 1 is a schematic illustration of a preferred embodiment of the invention employing two adsorbers.

In FIG. 1, crude gas at a temperature of + 38° C and at absolute pressure of 45 atm. is passed at a rate of 12,300 Nm³/hr. through line 1 into heat exchanger 2. The gas composition is $H_2$ = 73.032% by volume
CO = 24.691% by volume
$CH_4$ = 2.277% by volume The gas is cooled to −185° C in heat exchanger 2, whereby 2,639 Nm³/hr. of CO + $CH_4$ condense and are then separated from the gas in phase separator 3. The liquid (CO + $CH_4$) leaving separator 3 is decompressed to a pressure of 2.5 atm. abs. in throttle valve 4 and is fed into a regenerating column 5.

The crude gas partially freed of CO + $CH_4$ is passed from separator 3 to the bottom portion of a scrubbing column 6, where it is scrubbed countercurrently with 3,570 Nm³/hr. of liquid methane entering the head of the scrubber through line 7. The scrubbing column is under a pressure of 44.4 atm. abs., and the liquid methane is fed in at the heat at a temperature of −180° C. Under these conditions, impurities from the crude gas, mainly carbon monoxide and nitrogen are absorbed, leaving a concentration of impurities in the resultant hydrogen of about 1% by volume. The impurities left consist predominantly of washing agent, whereas carbon dioxide and nitrogen are contained in the washed gas only in the range of some ppm.

The loaded methane absorbent is then passes through line 8 into regenerating column 5 of which the sump is heated and into the head of which liquid carbon monoxide is passed through conduit 9. In the regenerating column, purified methane is the sump product and is recycled from column 5 to the head of column 6 via pump 10 and conduit 7.

The methane-free and possibly still nitrogeneous carbon monoxide vapor is withdrawn from the head of regenerating column 5 through line 11, where it is combined with a stream of carbon monoxide (described infra) and the combined streams of CO are passed to heat exchanger 12, indirectly heated against compressed carbon monoxide, then compressed to 25 atm. abs. in compressor 13, and is withdrawn via line 14 at a rate of 3,415 Nm³/hr.

A portion of the compressed CO (3,330 Nm³/hr.) is branched off through line 15, heat exchanged in heat exchanger 12 with less compressed carbon monoxide, and then is divided into two high pressure partial streams. The first high pressure partial stream (3,000 Nm³) is passed through coil 16 to heat the sump of regeneration column 5 to a temperature of −148° C. The second high pressure partial stream (330 Nm³) is withdrawn through line 17 and passed to a heat exchanger 18 to heat the scrubbed gas from scrubbing column 6, and is then returned through line 19 to point 20, the two partial streams being recombined at that point. Following recombination, the cooled CO streams are decompressed in a throttle valve 21 to a pressure of 2.5 atm. abs. and split into two low pressure partial streams. The first low pressure partial stream (3,000 Nm³/hr.) is passed through line 9 as reflux liquid into the head of regenerating column 5 while the second low pressure partial stream (330 Nm³/hr.) is passed into a heat exchanger 22 where it partially liquefies a desorption stream rich in methane (described infra), and then is combined via line 23 with the carbon monoxide withdrawn from the head of regenerating column 5.

The scrubbed hydrogen gas withdrawn from the head of scrubber 6 and passing through line 24 is saturated with methane by virtue of the scrubbing step. This stream is heated in heat exchanger 25° to about −160° C and then in 18 and thereafter fed to an adsorber 26 containing silicagel as adsorbent at which it enters at a temperature of −148° C. When passing through adsorber 26, the heated gas desorbs and entrains the components which were adsorbed in said adsorber during the preceding stage of operation, thereby resulting in the regeneration of adsorber 26. The resultant desorption stream leaves adsorber 26 through line 27 and thereupon is cooled in heat exchangers 25 (to about −175° C) and 22 to a temperature of −180° C. In this way, 70 Nm³/hr. of liquid methane is obtained and separated in phase separator 28 and are subsequently decompressed in a throttle valve 29 to the pressure of the regenerating column (2.5 atm. abs.) and introduced into the center portion of regenerating column 5. The gas from separator 28 — which is still charged with about 1% impurities — is passed through line 30 to a freshly regenerated adsorber 31 and there is it freed of impurities down to a concentration of about 0.1 to 0.2% by volume. Adsorber 31 operates at a temperature of about −178° C. The purified gas passes through line 32 to heat exchanger 2, where it cools the crude gas and is then withdrawn from the plant through line 33 as pure hydrogen (impurities <0.2%) at a rate of 8,620 Nm³/hr. Excess methane not required for scrubbing is withdrawn from the lower part of regenerating column 5 above the liquid phase, is also used to cool the crude gas in heat exchanger 2, and is then withdrawn via conduit 34.

Figure 2:
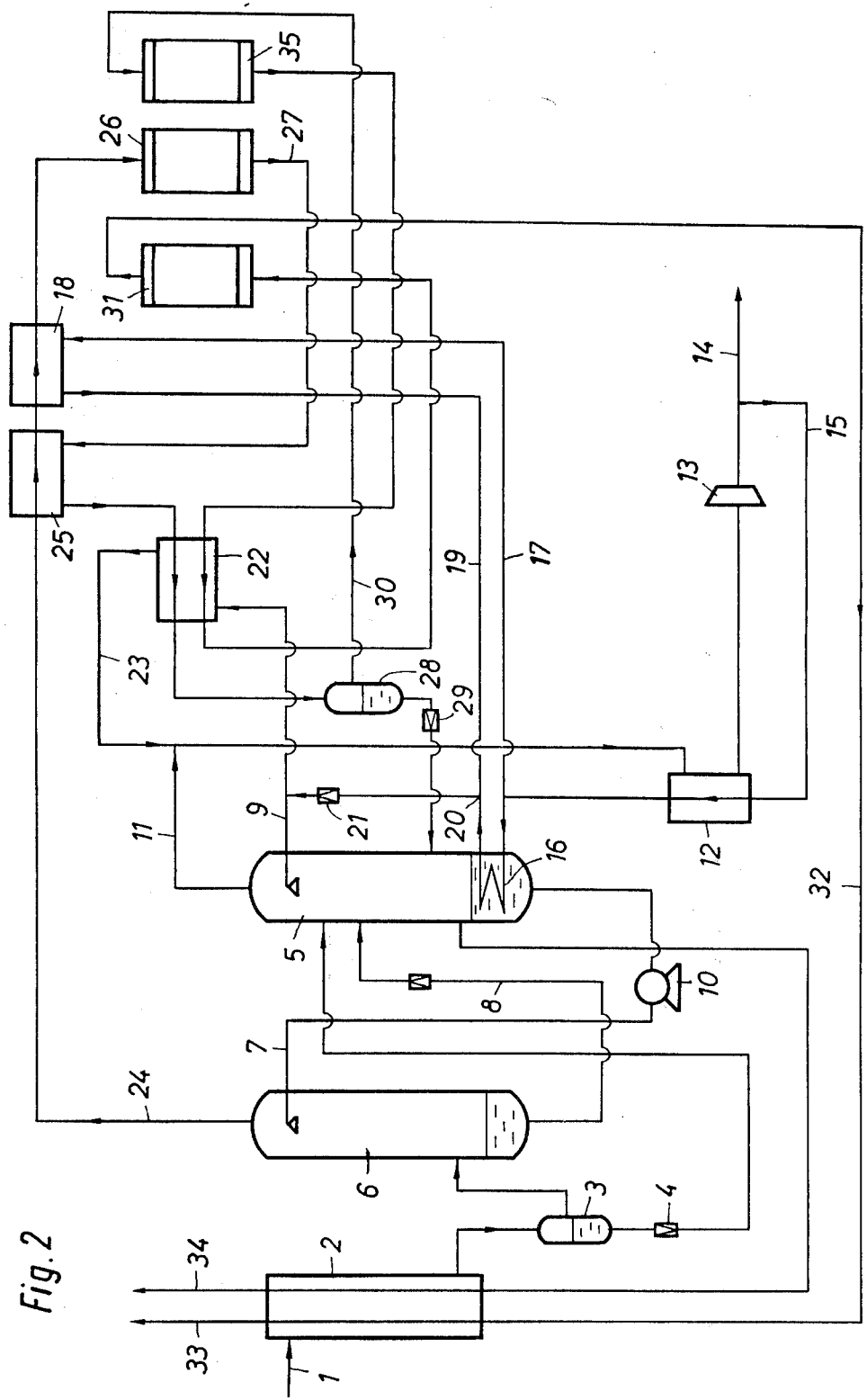
FIG. 2 is a schematic illustration of a preferred embodiment of the invention employing three adsorbers.

The embodiment of FIG. 2 in part duplicates FIG. 1. Therefore a description of the duplicate parts will not be repeated. In contrast to FIG. 1, however, the gas withdrawn from separator 28 through line 30 is passed through an additional adsorber 35 which previously was regenerated at a higher temperature, and cools it down to the adsorption temperature. The gas so heated is then passed through cooler 22 and recooled to −180° C. After the recooling step, it is passed into adsorber 31 where it will be freed of impurities down to a concentration of 0.1–0.2% by volume. Adsorbers 31, 26 and 35 are switchably interconnected and so arranged that they all will operate in the sequential steps of the process: adsorption, desorption, cooling. The conduits for switching are not shown inasmuch as the switching of adsorbers is generally well known.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the purification of semi-pure gas containing a minor quantity of a gaseous impurity, the steps comprising:
   a. passing said semi-pure gas at a temperature substantially above the condensation temperature of said gaseous impurity through a first adsorber loaded with said gaseous impurity to the extent of having a pressure of gaseous impurity emanating from the adsorbed impurity higher than the partial pressure of said gaseous impurity in the semi-pure gase, to desorb and entrain said gaseous impurity, thereby regenerating said first adsorber;
b. cooling resultant desorption gas containing said gaseous impurity to below the condensation temperature of said gaseous impurity to partially liquefy said gaseous impurity;
c. separating said liquefied gaseous impurity from equilibrium gas containing residual amounts of said gaseous impurity; and
d. passing said equilibrium gas, at a temperature below said condensation temperature of said gaseous impurity in step (b), through a second adsorber previously regenerated as in step (a), and removing at least a portion of said residual amounts of gaseous impurity to yield a purified gas.

2. A process according to claim 1, said pure gas being a hydrogen, said semi-pure gas being hydrogen-containing gas, and said gaseous impurity being methane.

3. A process according to claim 2, comprising the further steps of cooling a crude hydrogen-containing gas in indirect heat exchange relationship with purified hydrogen gas and scrubbing resultant cooled crude hydrogen-containing gas with liquid methane to yield scrubbed semi-pure hydrogen gas which is subjected to steps (a), (b), (c) and (d).

4. A process according to claim 3, said cooling in step (b) being conducted in indirect heat exchange with liquid carbon monoxide.

5. A process according to claim 4 wherein said scrubbed semi-pure hydrogen gas is heated in indirect heat exchange with gaseous carbon monoxide prior to step (a).

6. A process according to claim 5 comprising the further steps of passing said equilibrium gas from step (c) through a third absorber to cool same, and recooling said equilibrium gas prior to being subjected to step (d), said recooling being conducted in indirect heat exchange with liquid carbon monoxide.

7. A process according to claim 4 comprising the further steps of passing said equilibrium gas from step (c) through a third adsorber to cool same, and recooling said equilibrium gas prior to being subjected to step (d), said recooling being conducted in indirect heat exchange with liquid carbon monoxide.

8. A process according to claim 3 wherein said scrubbed semi-pure hydrogen gas is heated in indirect heat exchange with gaseous carbon monoxide prior to step (a).

9. A process according to claim 2, said cooling in step (b) being conducted in indirect heat exchange with liquid carbon monoxide.

10. A process according to claim 2, said temperature of said semi-pure gas in step (a) being at least 10° C. above the methane condensation temperature.

11. A process according to claim 10, wherein the adsorption step (c) is conducted at a temperature 5° to 60° C. lower than the desorption step (a).

12. A process according to claim 10, wherein the adsorption step (c) is conducted at a temperature 10° to 35° C. lower than the desorption step (a).

13. A process according to claim 2, said temperature of said semi-pure gas in step (a) being at least 25° to 45° C. above the methane condensation temperature.

14. A process according to claim 1 comprising the further steps of passing said equilibrium gas from step (c) through a third adsorber to cool same, and recooling said equilibrium gas prior to being subjected to step (d).

15. A process according to claim 1, wherein the adsorption step (c) is conducted at a temperature 5° to 60° C. lower than the desorption step (a).

16. A process according to claim 1, wherein the adsorption step (c) is conducted at a temperature 10° to 35° C. lower than the desorption step (a).

17. In the purification of semi-pure gas containing a minor quantity of a gaseous impurity, the steps comprising:
a. scrubbing crude gas with liquid to yield scrubbed semi-pure gas containing said liquid in gaseous form as said gaseous impurity;
b. passing resultant semi-pure gas at a temperature substantially above the condensation temperature of said gaseous impurity through a first adsorber loaded with said gaseous impurity to the extent of having a pressure of gaseous impurity emanating from the adsorbed impurity higher than the partial pressure of said gaseous impurity in the semi-pure gas;
c. cooling resultant desorption gas containing said gaseous impurity to below the condensation temperature of said gaseous impurity to partially liquefy said gaseous impurity;
d. separating said liquefied gaseous impurity from equilibrium gas containing residual amounts of said gaseous impurity; and
e. passing said equilibrium gas at a temperature below said condensation temperature of said gaseous impurity of step (c) through a second adsorber previously regenerated as in step (b), and removing at least a portion of said residual amounts of gaseous impurity to yield a purified gas.

18. A process according to claim 17, said pure gas being hydrogen, said semi-pure gas being hydrogen-containing and said gaseous impurity being methane.

19. A process according to claim 18, said temperature of said semi-pure gas in step (b) being at least 10° C above the methane condensation temperature.

20. A process according to claim 19, wherein at least about 40% of the methane is liquefied in step (c).

21. A process according to claim 19, wherein at lease 40 to 60% of the methane is liquefied in step (c).

22. A process according to claim 19, wherein the adsorption step (d) is conducted at a temperature 5° to 60° C. lower than the desorption step (b).

23. A process according to claim 19, wherein the adsorption step (d) is conducted at a temperature 10° to 35° C. lower than the desorption step (b).

24. A process according to claim 18, said temperature of said semi-pure gas in step (b) being at least 25° to 45° C. above the methane condensation temperature.

25. A process according to claim 17, wherein the adsorption step (d) is conducted at a temperature 5° to 60° C. lower than the desorption step (b).

26. A process according to claim 17, wherein the adsorption step (d) is conducted at a temperature 10° to 35° C. lower than the desorption step (b).

* * * * *